Figure 1:
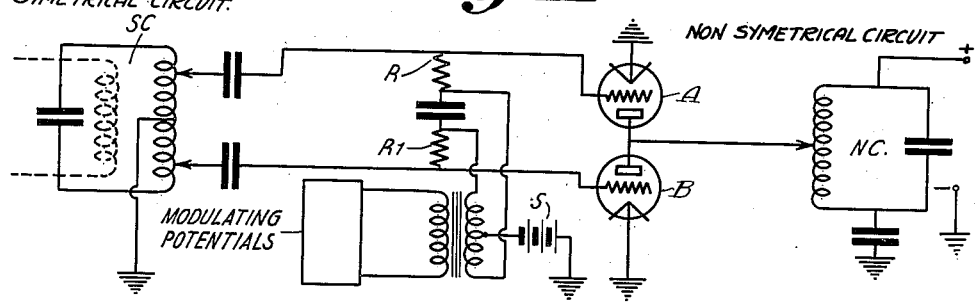

Dec. 7, 1937.  N. E. LINDENBLAD  2,101,438
NEUTRALIZED COUPLING CIRCUIT
Filed Feb. 27, 1935

INVENTOR.
NILS E. LINDENBLAD

BY *H. S. Grover*

ATTORNEY.

Patented Dec. 7, 1937

2,101,438

UNITED STATES PATENT OFFICE 2,101,438

NEUTRALIZED COUPLING CIRCUIT

Nils E. Lindenblad, Port Jefferson, N. Y., assignor to Radio Corporation of America, a corporation of Delaware Application February 27, 1935, Serial No. 8,447

20 Claims. (Cl. 179—171)

In its broadest aspect, this invention relates to a novel means for coupling a symmetrical circuit to a non-symmetrical circuit to permit transfer of energy from the former by way of a thermionic device to the latter, and includes means for preventing transfer of energy in either direction due to reactive coupling between the circuits. The coupled circuit is reactively neutralized in both directions so that the only flow of energy is in the desired direction and results from electron coupling by way of the discharge device.

Although in describing the invention some reference will be made to a particular practical application wherein the symmetrical circuit is assumed to be coupled to a high frequency generator, the non-symmetrical circuit to the coupling stud located in the field of the quarter-wave concentric cylinder line, and a source of modulating potentials associated with the coupling circuit per se in a frequency modulator system of the type disclosed in Lindenblad's U. S. application Ser. No. 13,886, filed March 30th, 1935, it must be understood that the present invention is not limited to such use.

On the contrary, the neutralized coupling circuit of the present invention is of wide application in the radio art, and is useful in any arrangement wherein it is desired to couple a symmetrical circuit to a non-symmetrical circuit and prevent the energy of said circuits from reacting on each other by way of the coupling means.

Figure 2:
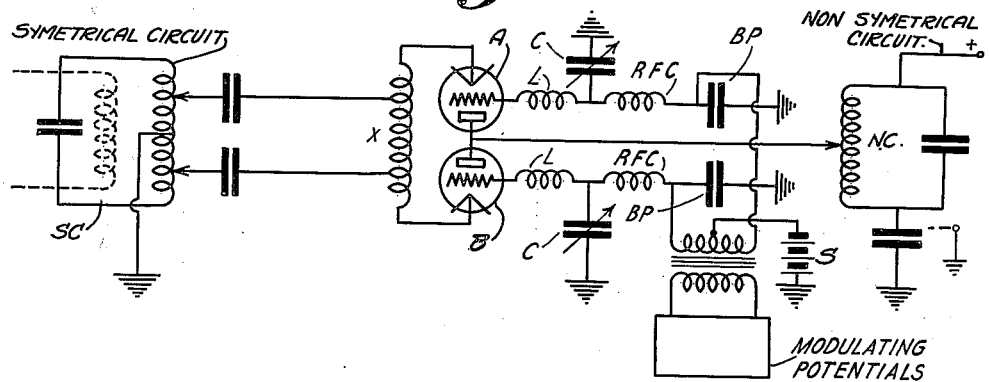
Figure 3:
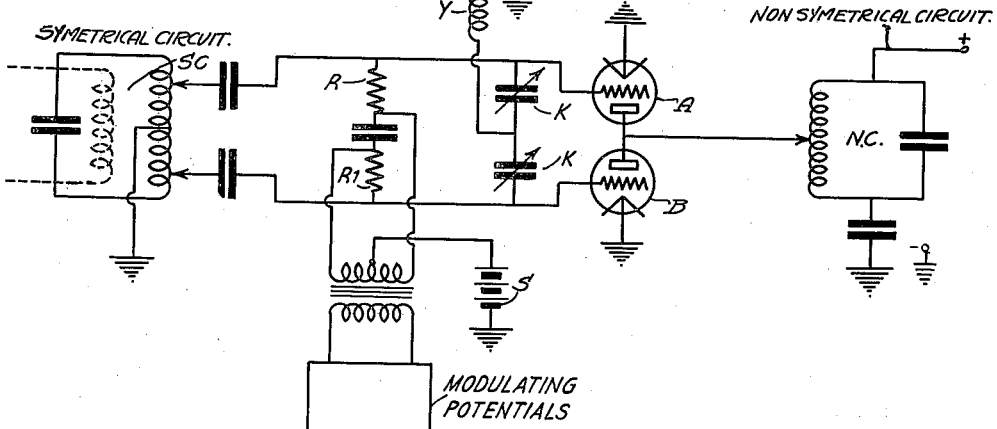

In describing my novel coupling circuit, reference will be made to the attached drawing throughout which like reference characters indicate like parts insofar as possible, and in which:

Fig. 1 illustrates a novel manner of coupling a symmetrical circuit to a non-symmetrical circuit and is used to illustrate the problems encountered in working out the preferred circuits; and Figs. 2 and 3 are circuit modifications of the arrangement of Fig. 1, and each of the circuits of Figs. 2 and 3 includes means for preventing reactive coupling between the symmetrical circuit and the non-symmetrical circuit.

Referring to Fig. 1, SC is a symmetrical circuit including an inductive reactance symmetrically grounded. Points on the inductive reactance of SC are connected by way of condensers, as shown, in push-pull fashion to the control grids of a pair of thermionic tubes A and B. The cathodes of the tubes A and B are grounded and the anodes are tied together and connected to a point on the non-symmetrical circuit NC, which may be also connected to a source of direct current plate potential. Equal direct current biases for the control grids of tubes A and B are supplied from a source S connected as shown to ground and by way of resistances R and $R_1$ to the control grids of tubes A and B, respectively.

The circuit SC may be coupled to any source of alternating current to be relayed. The circuit NC may supply amplified or frequency multiplied alternating current energy of any nature to any known utilization circuit. When equal bias is applied to the control grid of each tube A and B, no energy is transferred from SC to NC. Now, if the bias or excitation on the grids of the tubes becomes unequal, one tube becomes more conductive than the other, and the tubes supply unequal amounts of energy to the circuit NC. When the tube A passes the most current, the non-symmetrical circuit will be excited according to a phase which is opposite to the phase it would have if it were excited through tube B. As long as the tubes A and B are equally biased or energized, there is no coupling from the push-pull or symmetrical circuit by way of the tubes to the non-symmetrical circuit. The system is accordingly reactively neutralized in the direction from the symmetrical to the non-symmetrical circuit. When energy is transferred from the symmetrical circuit to the non-symmetrical circuit, such transfer is due or results from the unbalancing of the electron current through the tubes. The coupling obtained during the unbalancing is accordingly non-reactive.

If we now consider the coupling in the opposite direction, we find that the non-symmetrical circuit will tend to superimpose push-push energy, through the capacity coupling established by the tube elements, onto the push-pull or symmetrical circuit. A circuit that carries both push-pull and push-push energy loses its electrical symmetry and causes trouble, in that it can no longer be symmetrically coupled to other symmetrical circuits. It might appear that this push-push energy would flow from the plate of each tube to the grid of the respective tube and on into the two halves of the inductance of SC to oppose and cancel. This does not hold true in practice, however, due to the leakage of flux to ground, the lack of symmetry of the halves of the inductance, etc. Moreover, if an attempt is made to overcome this defect by coupling the load to each half of the symmetrical circuit looser or tighter than the other half, additional difficulty is encountered in that equal energy cannot be fed to the two halves of the circuit. This defect also necessitates greater shielding precautions to prevent undesired radiation of the push-push component from the circuits in which it flows.

In Fig. 2, I have shown an arrangement somewhat similar to the arrangement of Fig. 1. However, in Fig. 2, I have provided means for preventing the push-push component from the non-symmetrical circuit from reaching or affecting the symmetrical circuit. This is accomplished by connecting an inductance X between the cathodes of the thermionic tubes A and B and connecting points on this inductance to the inductance of the symmetrical circuit, as shown. The cathodes of the tubes A and B which may be of the directly or indirectly heated type are now raised above ground radio frequency potential. The control grids of the tubes A and B are connected to ground, as shown, by inductances L in series with capacities C. The reactances LC are tuned to the frequency of the oscillation to be transferred from the symmetrical circuit to the non-symmetrical circuit and accordingly provide short-circuits for said frequencies between the control grids and ground. The push-push components tending to flow from the circuit NC by way of the tubes A and B to the circuit SC are shielded off by the grounded grids and prevented from entering the filament input circuit. Here, as in Fig. 1, the control grids are equally biased by potentials from a source S connected by way of chokes RFC to the control grids of the tubes. The oscillations dealt with are shunted around the source S and other apparatus connected to the control grids for a purpose to be described later by by-pass condensers BP connected between the chokes and ground.

It is, however, very desirable from an efficiency standpoint and for various other reasons, such as the introduction of a minimum of capacity in the differential biasing circuit, to feed the input to the grids rather than to the cathodes of the tubes as in Fig. 2. An arrangement for accomplishing this has been shown in Fig. 3.

In Fig. 3, each grid is coupled by way of a variable condenser K to a common inductance Y, the other terminal of which is grounded. For push-push feedback potentials from the non-symmetrical circuit NC, the two condensers K are in parallel as are the tube capacities and form in conjunction with the inductance Y a tuned short-circuit for the operating frequencies between each grid and ground, thus establishing the aforementioned desirable shielding effects. For push-pull feed forward however, the inductance Y is in a neutral zone and does not form a part of the input alternating current circuit. The two auxiliary condensers K may if desired be made very small and the inductance Y may if desired be made very large.

In a particular application of the invention, the inductance SC is coupled to an oscillation generator of the type disclosed in my U. S. application No. 13,886, filed March 30th, 1935, referred to above. The circuit SC may be coupled to the output of the oscillation generator of said application. Modulating potentials are applied, as shown, from a source of modulating potentials connected in Figs. 1 and 3 by way of resistances R and R1, to the control grids of the tubes A and B. The control grids of the tubes are now biased so that the tubes operate on the linear portion of their characteristic curves. As the grids of the tubes are swung as to potential in phase opposition at the signal frequency, the tubes supply varying amounts of energy of unlike or opposite phase to the circuit NC due to the electron coupling thru the neutralized tubes. The phase of the energy in the circuit NC is accordingly reversed at signal frequency. The circuit NC may be coupled as described more in detail in application #13,886 filed March 30, 1935, to a stud located in the field of the quarter-wave length concentric cylinder frequency control line, connected with said oscillation generator, to aid or oppose the oscillating energy in said line to produce frequency modulation of the oscillations fed from the high frequency generator to said quarter-wave length line. The high frequency generator may as disclosed in application #13,886 filed March 30, 1935, also apply the driving energy to the symmetrical circuit SC. Thus, high frequency oscillations modulated in frequency at signal frequency are produced in the system, comprising the generator, the quarter-wave line, and the modulator including SC, the balanced relay, and NC, and may be supplied from any one of said devices to a load circuit.

In the arrangement of Fig. 2, the modulating potentials are supplied by way of radio frequency choking inductances RFC and the inductances L to the control grids of the tubes A and B. Bypassing condensers BC are connected as shown between the inductances RFC and ground to prevent radio frequency oscillations from entering the modulation potential source.

Obviously the symmetrical circuit SC may be coupled to a source of signal modulated waves and the modulation potential source may be replaced by a source of local oscillations which may be beat with the signal modulated wave to produce the signal or an intermediate frequency carrying the signal in the circuit NC. In this case, the bias supplied to the tubes A and B is such that when modified by the supplied potentials the tubes operate the same as demodulators i. e., at or near one of the curved portions of their characteristic curves.

Of course, if carrier wave potentials or potentials of any frequency are applied to the circuit SC and the control grids are maintained at equal potentials of proper value so that the tubes operate on the linear portions of their characteristic curves the potentials will be increased in amplitude in the tubes A and B and will be doubled in frequency in the circuit NC, due to the push-pull application of the changing potentials to the grids of the tubes and the push-push application of the potentials from the anodes of the tubes to the circuit HC. Thus, the neutralized circuit produces frequency multiplication of the changing potentials.

What is claimed is:

1. In a relaying system, a symmetrical circuit arranged to be energized by alternating potentials to be relayed, a non-symmetrical circuit, a pair of electron discharge tubes each having an anode, a cathode and a control grid, a circuit connecting the anodes of said tubes together and to said non-symmetrical circuit, leads connecting points of opposite alternating potential on said symmetrical circuit to like electrodes in said tubes, and reactances tuned to the frequency of the wave to be relayed connecting like electrodes in said tubes to ground to prevent energy in said non-symmetrical circuit from reacting through said tubes on said symmetrical circuit.

2. In a wave relaying system, a symmetrical circuit arranged to be energized by the alternating potentials to be relayed, a non-symmetrical circuit, a pair of electron discharge tubes each having an anode, a cathode and a control grid, a circuit connecting the anodes of said tubes in push-push relation to said non-symmetrical circuit, leads connecting points of opposite alternating potential on said symmetrical circuit to like electrodes of said tubes, and capacitive and inductive reactances in series connecting like electrodes in said tubes to ground, said reactances forming circuits tuned to the frequency of the wave to be relayed between the said like electrodes and ground.

3. In a signalling system, a symmetrical circuit symmetrically grounded, a non-symmetrical circuit, a pair of electron discharge tubes each having an anode, a cathode and a control grid, a circuit connecting the anodes of said tubes together and to said non-symmetrical circuit, leads connecting points of opposite alternating potential on said symmetrical circuit to the control grids of said tubes, variable capacitive reactances coupling the control grids together, and an inductive reactance coupling the point between said variable capacitive reactances to ground said inductive reactance and capacitive reactances forming paths of low impedance for potentials appearing in said non-symmetrical circuit which it is desired to prevent from reaching said symmetrical circuit.

4. In a radio frequency wave relaying system, a symmetrical circuit arranged to be energized by radio frequency potentials to be relayed, a non-symmetrical circuit, a pair of electron discharge tubes each having an anode, a cathode and a control grid, a circuit connecting the anodes of said tubes together and to said non-symmetrical circuit, leads connecting points of opposite radio frequency potential on said symmetrical circuit to like electrodes in said tubes, and series inductive and capacitive reactances tuned to the frequency of the potentials to be relayed connecting like electrodes in said tubes to ground to prevent energy in said non-symmetrical circuit from reacting through said tubes on said symmetrical circuit.

5. In a wave relaying system, a symmetrical circuit arranged to be energized by wave potentials to be relayed, a non-symmetrical circuit, a pair of electron discharge tubes each having an anode, a cathode and a control grid, a circuit connecting the anodes of said tubes together and to said non-symmetrical circuit, leads connecting points of opposite wave potential on said symmetrical circuit to the grid electrodes in said tubes, and series inductive and capacitive reactances tuned to the frequency of the wave to be relayed connecting the grid electrodes in said tubes to ground to prevent energy in said non-symmetrical circuit from reacting through said tubes on said symmetrical circuit.

6. In a relaying system, a source of radio frequency potential, a symmetrical input circuit symmetrically grounded and coupled to said source of radio frequency potential, a non-symmetrical output circuit, a pair of electron discharge tubes each having an emission element, and a pair of cold electrodes, conductors connecting like cold electrodes of said tubes in push-push relation by way of said non-symmetrical circuit, a reactance connecting the emission elements of said tubes together, conductors connecting points on said reactance to points of different radio frequency potential on said symmetrical circuit, and series resonant circuits connecting like cold electrodes of said tubes to ground.

7. In a signalling system, a symmetrical circuit symmetrically grounded, said circuit being adapted to be energized by oscillatory potentials, a non-symmetrical circuit, a pair of electron discharge tubes each having an anode, a cathode and a control grid, a circuit connecting the anodes of said tubes together and to said non-symmetrical circuit, an inductive reactance connecting the cathodes of said tubes together said cathodes being raised above ground alternating current potential, conductors connecting points on said inductive reactance to points of opposite oscillatory potential on said symmetrical circuit, and series resonant circuits comprising inductance and capacity connecting the control grids of said tubes to ground.

8. In a system for relaying oscillatory radio frequency potentials and modifying the character of the relayed potentials in accordance with controlling potentials, a symmetrical circuit symmetrically grounded, means for setting up oscillatory radio frequency potentials in said circuit, a non-symmetrical circuit, a pair of electron discharge tubes each having an anode, a cathode and a control grid, a circuit connecting the anodes of said tubes together and to said non-symmetrical circuit, an inductive reactance connecting the cathodes of said tubes together, leads connecting points on said inductive reactance to points of opposite radio frequency potential on said symmetrical circuit, series resonant circuits connected between the control grids of said tubes and ground, and a source of modulating potentials connected with the control grids of said tubes.

9. In a wave relaying system, a symmetrical circuit on which waves to be relayed may be impressed, a non-symmetrical circuit, a pair of electron discharge tubes each having an anode, a cathode and a control grid, a circuit connecting the anodes of said tubes together and to the non-symmetrical circuit, series reactances connected between the control grids of said tubes, a reactance connecting a point on said series reactances to a point on said symmetrical circuit, said last named reactance and said series reactances being of low impedance to potentials impressed by the anodes of said tubes on the control grids of said tubes by way of the tube capacities between said electrodes, and leads connecting the control grids of said tubes in push-pull fashion to said symmetrical circuit.

10. In a wave relaying system, a symmetrical circuit on which waves to be relayed may be impressed, a connection between said symmetrical circuit and ground, a non-symmetrical circuit, a pair of electron discharge tubes each having an anode, a cathode and a control grid, a circuit connecting the anodes of said tubes together and to the non-symmetrical circuit, a pair of series reactances connected between the control grids of said tubes, an inductive reactance connecting a point between said series reactances to ground, said inductive reactance with said series reactances being of low impedance to potentials transferred from said anodes to said control grids by way of the capacity between said electrodes, and leads connecting the control grids of said tubes in push-pull fashion to said symmetrical circuit.

11. In a signalling system, a symmetrical circuit symmetrically grounded, a non-symmetrical circuit, a pair of electron discharge tubes each having an anode, a cathode and a control grid, a circuit connecting the anodes of said tubes together and to the non-symmetrical circuit, series capacitive reactances connected between the control grids of said tubes, an inductive reactance connecting a point between said series reactances to ground, leads connecting the control grids of said tubes in push-pull fashion to said symmetrical circuit, a source of modulating potentials, and transformer means connecting said source of modulating potentials in phase opposition to the control grids of said tubes.

12. In a system for relaying carrier wave energy and modifying the same in accordance with other potentials, a symmetrical circuit arranged to be energized by the carrier wave potentials to be modulated, a non-symmetrical circuit, a pair of electron discharge tubes each having an anode, a cathode and a control grid, a circuit connecting the anodes of said tubes in push-push relation to said non-symmetrical circuit, leads connecting points of opposite carrier wave potential on said symmetrical circuit to like electrodes of said tubes, capacitive and inductive reactances in series connecting like electrodes in said tubes to ground, said reactances forming circuits tuned to the frequency of the wave potentials to be relayed between the said like electrodes and ground, and a circuit for applying modulating potentials in phase opposition to like electrodes in said tubes.

13. In a wave relaying system, a symmetrical circuit on which wave energy to be relayed may be impressed, a non-symmetrical circuit to which said wave energy is to be relayed, a pair of electron discharge devices each having a plurality of like electrodes, a circuit connecting like electrodes of said device in push-pull relation to spaced points on said symmetrical circuit, a circuit connecting other like electrodes of said devices together and in push-push relation to said non-symmetrical circuit, and reactances of low impedances to the push-push potentials impressed on said non-symmetrical circuit coupling like electrodes in said tubes to ground whereby the push-push potentials in said non-symmetrical circuit are prevented from reaching said symmetrical circuit.

14. In a signalling system, a symmetrical circuit on which wave energy may be impressed, a non-symmetrical circuit to which said wave energy is to be transferred from said symmetrical circuit, a pair of electron discharge devices each having a plurality of like electrodes, a circuit connecting like electrodes of said devices in push-pull relation to spaced points on said symmetrical circuit, a circuit connecting other like electrodes of said devices together and in push-push relation to said non-symmetrical circuit, reactances of low impedance to the push-push potentials impressed on said non-symmetrical circuit coupling like electrodes in said devices to ground whereby the push-push potentials in said non-symmetrical circuit are prevented from reaching said symmetrical circuit, and a source of modulating potentials coupled in phase opposition to like electrodes of said devices.

15. In a radio frequency wave relaying system, a symmetrical circuit arranged to be energized by radio frequency potentials to be relayed, a non-symmetrical circuit to which said radio frequency potentials are to be relayed, a pair of electron discharge tubes each having electrodes including an anode, a cathode, and a controlling electrode, means connecting the anodes of said tubes together and to said non-symmetrical circuit, means for applying radio frequency potentials of unlike phase from said symmetrical circuit to like electrodes in said tubes, and inductive and capacitive reactances series tuned to the frequency of the radio frequency potentials to be relayed connecting like electrodes in said tubes to the cathodes of said tubes to prevent energy in said non-symmetrical circuit from reacting through said tubes on said symmetrical circuit.

16. In a wave relaying system a symmetrical circuit arranged to be energized by wave potentials to be relayed, a non-symmetrical circuit to which said wave potentials are to be relayed, a pair of electron discharge tubes each having an anode, a cathode, and a controlling electrode, a circuit connecting the anodes of said tubes together and to said non-symmetrical circuit, means for applying wave potentials in phase displaced relation to the controlling electrodes of said tubes from said symmetrical circuit, an inductive reactance connected at one terminal to the cathodes of said tubes, and separate capacitive reactances connecting the controlling electrode in each of said tubes to the other terminal of said inductive reactance, said capacitive reactances and common inductive reactance being series tuned to form paths of low impedance for potentials of the frequency of the wave potentials to be relayed.

17. In a relaying system a source of radio frequency potentials, a symmetrical input circuit coupled to said source of radio frequency potentials, a non-symmetrical output circuit, a pair of electron discharge tubes each having an emission element, and a pair of auxiliary electrodes, conductors connecting like auxiliary electrodes of said tubes in push-push relation to said non-symmetrical circuit, an inductive reactance connecting the emission elements of said tubes together, linear conductors connecting points on said inductance to points of different radio frequency potential on said symmetrical circuit and separate capacitive reactances connecting like auxiliary electrodes of said tubes to ground to form paths of low impedance at the frequency of the potentials to be relayed between said like auxiliary electrodes and ground.

18. In a relaying system, a symmetrical circuit arranged to be energized by wave energy to be relayed, a non-symmetrical circuit to which said wave energy is to be relayed, a pair of electron discharge tubes each having an anode, a cathode, and a controlling electrode, a connection between the cathodes of said tubes and a point of electrical symmetry on said symmetrical circuit, a circuit connecting the anodes of said tubes together and to said non-symmetrical circuit, means connecting points of displaced wave potential on said symmetrical circuit to the controlling electrodes of said tubes, and series inductive and capacitive reactances tuned to the frequency of the wave to be relayed connecting the controlling electrodes in said tubes to the cathodes of said tubes to prevent energy in said non-symmetrical circuit from reacting through said tubes on said symmetrical circuit.

19. In a signalling system for relaying oscillatory radio frequency potentials and modifying the character of the relayed potentials in accordance with controlling potentials, a symmetrical circuit, means for setting up oscillatory radio frequency potentials in said symmetrical circuit, a non-symmetrical circuit to which said oscillatory potentials are to be relayed, a pair of electron discharge tubes each having an anode, a cathode, and a controlling electrode, a circuit connecting the anodes of said tubes together and to said non-symmetrical circuit, an inductive reactance connecting the cathodes of said tubes together, linear conductors connecting points on said inductive reactance to points of opposed radio frequency potential on said symmetrical circuit, series resonant circuits connecting the controlling electrodes of each of said tubes to a point of electrical symmetry on said symmetrical circuit, and means for controlling the impedance of said tubes in phase opposition in accordance with controlling potentials.

20. In a system for relaying carrier wave energy and modifying the same in accordance with other potentials, a symmetrical circuit arranged to be energized by carrier wave energy to be modulated, a non-symmetrical circuit to which said carrier wave energy is to be relayed, a pair of electron discharge tubes each having an anode, a cathode, and a controlling electrode, a circuit connecting the anodes of said tubes in push-push relation to said non-symmetrical circuit, leads connecting points of unlike wave potentials on said symmetrical circuit to the control electrodes of said tubes, means connecting the cathodes of said tubes to a point of electrical symmetry on said symmetrical circuit, capacitive reactances in series with a common inductive reactance connecting said controlling electrodes to the cathodes of said tubes to by-pass the wave energy potentials to be relayed, and a circuit for applying modulating potentials in phase displaced relation to like electrodes in said tubes.

NILS E. LINDENBLAD.